United States Patent [19]

Szczesniak

[11] Patent Number: 5,453,149

[45] Date of Patent: Sep. 26, 1995

[54] IMPROVED PROCESS FOR EFFECTING ELECTROMAGNETIC BONDING OF PLASTIC PARTS

[75] Inventor: Robert J. Szczesniak, Ringwood, N.J.

[73] Assignee: Ashland Oil Company, Russell, Ky.

[21] Appl. No.: 652,132

[22] Filed: Feb. 7, 1991

Related U.S. Application Data

[62] Division of Ser. No. 475,418, Feb. 2, 1990, abandoned.

[51] Int. Cl.⁶ ..................................................... B32B 31/00
[52] U.S. Cl. .......................... 156/272.4; 156/69; 264/262; 264/404; 264/486
[58] Field of Search .............................. 264/25, 26, 262; 156/69, 272.4

[56] References Cited

U.S. PATENT DOCUMENTS

| | | | |
|---|---|---|---|
| 2,303,322 | 3/1941 | Bigger | 493/103 |
| 2,553,259 | 5/1951 | Hagedorn | 156/69 |
| 3,808,073 | 4/1974 | Navarre | 156/69 |
| 3,940,845 | 3/1976 | Czerwiak | 156/272.4 |
| 4,201,306 | 5/1980 | Dubois et al. | 156/69 |
| 4,880,580 | 11/1989 | Bowers et al. | 264/26 |

Primary Examiner—Patrick J. Ryan
Assistant Examiner—Merrick Dixon
Attorney, Agent, or Firm—Louis E. Marn

[57] ABSTRACT

An improved electromagnetic bonding process wherein the plastic parts or components to be bonded are configured to be positioned with respect to each other at the point of bonding under a frictional or interference fitting relationship embraced by the interpositioning of thermoplastic electromagnetic bonding material at the bonding point whereupon an electromagnetic field is generated to melt thermoplastic electromagnetic bonding material thereby fusing the plastic parts or components. In a particularly preferred embodiment a plastic container is formed having hemispherically-shaped top and bottom closures bonded to a cylindrically-shaped body member.

6 Claims, 2 Drawing Sheets

IMPROVED PROCESS FOR EFFECTING ELECTROMAGNETIC BONDING OF PLASTIC PARTS

This is a division, of application Ser. No. 07/475,418, filed Feb. 2, 1990, now abandoned.

BACKGROUND OF THE INVENTION

(1) Field of the Invention

This invention relates to a plastic container assembly, and more particularly to a plastic container assembly and improved electromagnetic bonding process for installing plastic end caps on a plastic cylinder to form such a plastic container assembly.

(2) Description of the Prior Art

In U.S. Pat. No. 4,201,306 to Dubois et al., there is disclosed a process for forming a plastic drum having a lower bottom closure and a top closure welded to the drum shell using thermoplastic bonding system, such as described in U.S. Pat. Nos. 3,620,875 and 3,620,876.

Smaller PVC plastic containers, such as potable water containing activated carbon particles, are produced by solvent bonding injection molded end caps to an extruded plastic cylinder cut to predetermined lengths. The end caps are formed to provide for interference fit with the extruded cylinder, however, PVC bonding required a drying period prior to packaging as well as produced variable bonding results. Additionally, failure rates were unacceptably high thereby concomitantly resulting in low productivity and higher end product costs.

PVC bonding includes surface treatment of a primer plus a solvent solution of PVC resin at relatively low solids content, e.g. about 20%. Due to the hydrogen parameters of PVC solvents, retained solvents or vapor lock occurs which requires oven drying to remove solvents, and even then, solvent odors remain in the product. With ever increasing concerns for air quality, the presence of solvents will require apparatus for effective solvent control thereby requiring capital expenditure for effective control.

OBJECTS OF THE INVENTION

An object of the present invention is to provide an improved process for providing plastic end caps to a plastic cylinder to form a plastic container assembly.

Another object of the present invention is to provide an improved plastic and cap configuration for a plastic cylinder for a plastic container assembly.

Yet another object of the present invention is to provide an improved electromagnetic bonding process for manufacturing a plastic assembly.

Still another object of the present invention is to provide an improved process for providing plastic end caps to a plastic cylinder to form a plastic container assembly at improved production rates at high reliability rates.

A still further object of the present invention is to provide an improved process for providing plastic end caps to a plastic cylinder to form a plastic container assembly with little if any environmental contamination.

SUMMARY OF THE INVENTION

These and other objects of the present invention are achieved by an improved electromagnetic bonding process wherein the plastic parts or components to be bonded are positioned with respect to each other at the point of bonding under a frictional or interference fitting relationship enhanced by the interpositioning of thermoplastic electromagnetic bonding material at the bonding point whereupon the generation of an electromagnetic field melts the thermoplastic electromagnetic bonding material thereby fusing together the plastic parts or components. In an embodiment thereof an improved plastic container is formed having hemispherically-shaped top and bottom end closure members bonded to an intermediate cylindrically-shaped body member.

BRIEF DESCRIPTION OF THE DRAWINGS

A better understanding of the present invention as well as other objects and advantages thereof will become apparent upon consideration of the detailed disclosure thereof, especially when taken with the accompanying drawing wherein like numerals indicate like parts and wherein.

DETAILED DESCRIPTION OF THE INVENTION

Figure 1:
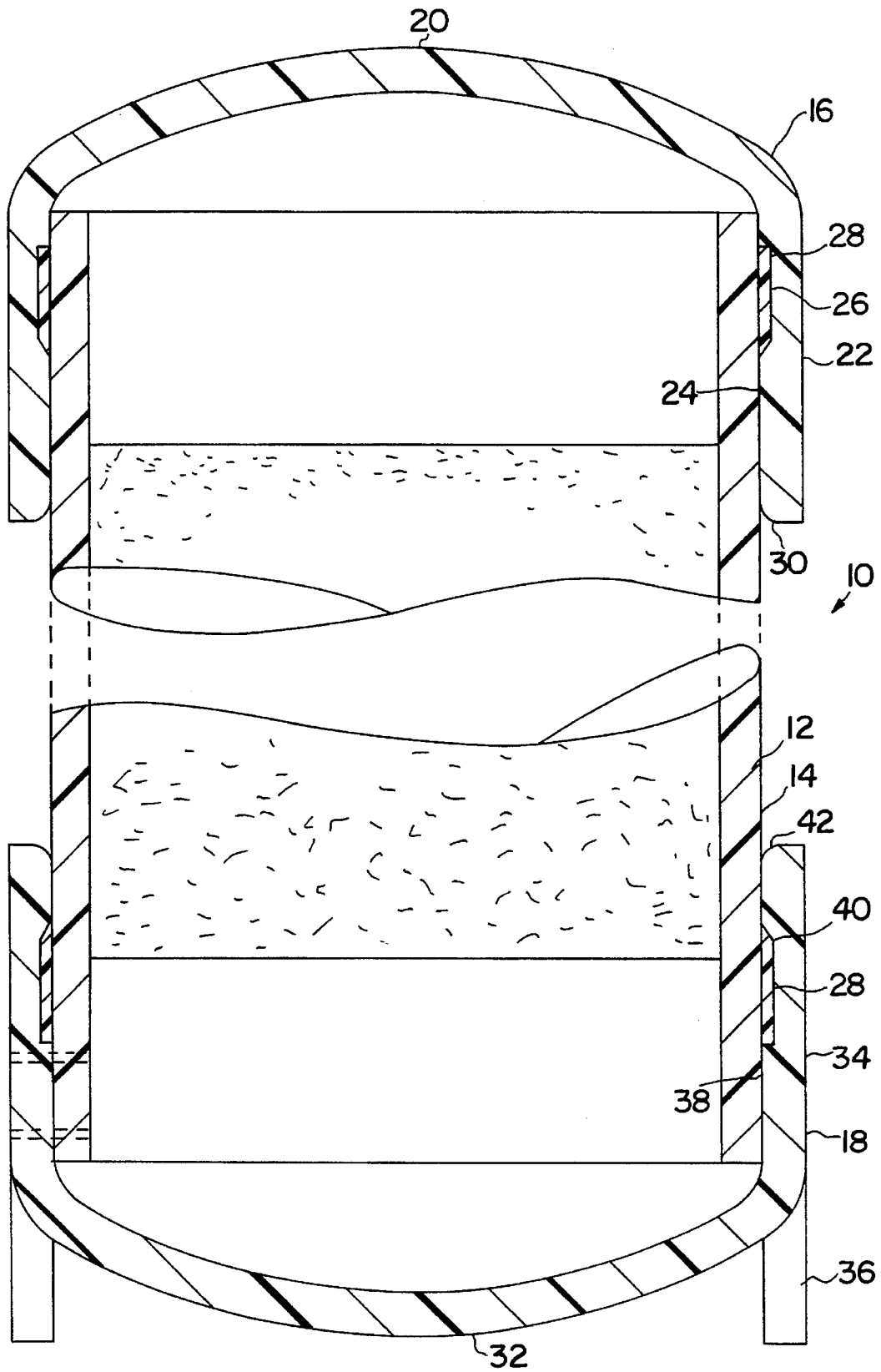
FIG. 1 is a cross-sectional elevational view of a plastic container assembly formed in accordance with the present invention illustrating one embodiment of the present invention.

Referring now to FIG. 1, there is illustrated a plastic container assembly manufactured by the process of the present invention, generally indicated as 10, and comprised of a cylindrically-shaped body member 12 forming an outer side wall 14 thereof, a top closure member 16 and a bottom closure member 18 encircling upper and lower portions respectively, of the body member 12. The top closure member 16 is generally injection molded and is formed with a hemispherically-shaped end portion 20 extending to a cylindrically-shaped side wall portion 22. An inner surface 24 of the side wall portion 22 of the top end closure member 16 is formed with a cylindrically-shaped groove 26 for positioning the injection molded gasket ring 28, as more fully hereinafter described. The inner surface 24 of the side wall portion 22 of the top end closure member 16 is formed with a curved inner leading surface 30 to facilitate positioning therein of the upper end portion of the body member 12 and is configured to cooperate with the outer surface of the side wall 14 of the body member 12.

The bottom end closure member 18 is likewise formed of a hemispherically-shaped end portion 32 extending to cylindrically-shaped side wall portion 34 including a cylindrically-shaped skirt portion 36. An inner surface 38 of the side wall portion 34 of the bottom end closure member 18 is formed with a cylindrically-shaped groove 40 for positioning a like injection molded gasket ring 28. The inner surface 38 of the side wall portion 34 of the bottom end closure member 18 is formed with a curved inner leading surface 42 to facilitate positioning thereon of the lower end portion of the body member 14 and is configured to cooperate with the outer surface of the side wall 14 of the body member 12.

The cylindrically-shaped gasket ring member 28 is formed of an injection molded thermoplastic material, such as PVC containing an electromagnetic material, such as iron filings. Since the gasket member 28 is to be positioned within the groove 26 and 42 formed in the top and bottom end closure member 16 and 18, respectively and traverse an area of smaller diameter than the outer diameter of the grooves 26 and 42, the gasket member 28 is formed of a resilient thermoplastic formulation to permit positioning thereof within the grooves 26 and 42 without fracturing the integrity thereof. The configuration of the grooves 26 and 42 and the shaping of the gasket 28 ensures proper positioning of the precursor electromagnetic bonding gasket 28 to ensure subsequent weld processing protocol to result in an efficacious bond between the body member 12 and the end closures as more fully hereinafter disclosed. The cylindrically-shaped gasket member 28 is formed with an internal diameter to cooperate in interferring relationship to the outer surface 14 of the side wall 14 of the body member 12.

Figure 2:
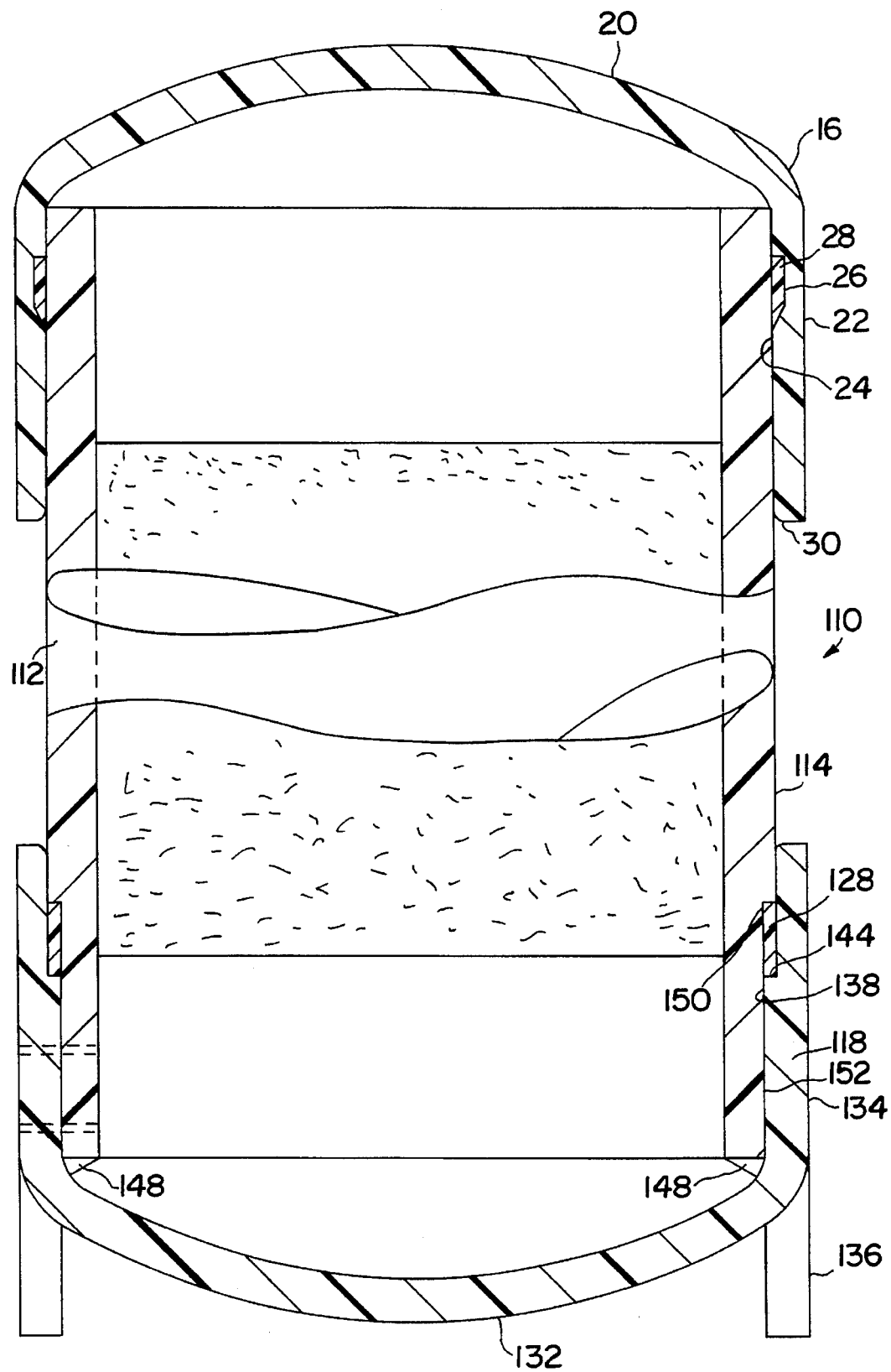
FIG. 2 is a cross-sectional elevational view of another embodiment thereof.

Referring now to FIG. 2, there is illustrated another embodiment of the present invention of a plastic container assembly generally indicated as 110, and comprised of a cylindrically-shaped body member 112 forming an outer side wall 114 thereof, a top closure member 16 and a bottom closure member 118 encircling upper and lower portions respectively, of the body member 112. The top closure member 16 is generally injection molded and is formed with a hemispherically-shaped end portion 20 extending to a cylindrically-shaped side wall portion 22. An inner surface 24 of the side wall portion 22 of the top end closure member 16 is formed with a cylindrically-shaped groove 26 for positioning the injection molded gasket ring 28. The inner surface 24 of the side wall portion 22 of the top end closure member 16 is formed with a curved inner leading surface 30 to facilitate positioning therein of the upper end portion of the body member 12 and is configured to cooperate with the outer surface of the side wall 14 of the body member 12.

The bottom end closure member 118 is likewise formed of a hemispherically-shaped end portion 132 extending to cylindrically-shaped side wall portion 134 including a cylindrically-shaped skirt portion 136. An inner surface 138 of the side wall portion 134 of the bottom end closure member 118 is formed with an annularly-shaped shoulder portion 144 for positioning an injection molded gasket ring member 128. At a lower inner portion of the bottom end closure member 118, there is formed an inwardly extending annularly-shaped ring portion 148, as more fully hereinafter described. The outer surface 114 of the cylindrically-shaped body member 112 to be positioned within the bottom end closure 118 is formed with an inwardly extending shoulder 150 forming a cylindrically-shaped surface 152 configured to cooperate with the surface 138 of the side wall 118 of the end closure member 110 with the respective shoulders portions defining an annular ring-shaped space for receiving the gasket ring member 128.

Forming of the plastic container assembly 10 referring to FIG. 1 is effected by positioning a gasket member 28 in the respective grooves 26 and 42 of the top and bottom closure member 12 and 16, respectively. Generally, the body member 12 is then inserted into the bottom end closure member 18 and compressed into a position stop with an interference fit between the gasket member 28, as well as the inner surface 38 of the bottom closure member 18. A coil (not shown) is peripherally disposed about the bottom end closure 18 proximate the gasket member 28 and is connected to a source of a high frequency alternating current to establish an electromagnetic field through the thermoplastic electromagnetic gasket member 28 to thereby raise the temperature of the thermoplastic material to fusing temperature as a result of heat losses (eddy current and hysteresis), from the electromagnetic material thereby to bond or weld time bottom end closure 18 to the body member 12.

Thereafter, the open end is filled with carbon powder and filter media, for use as a potable water container and the top end portion of the body member 12 is similarly compressed into a position stop with an interference fit between the gasket member 28 and the inner surface 24 of the side wall portion 22 of the top end closure member 16. A coil (not shown) is peripherically disposed about the top end closure 16 proximate the gasket member 28. The gasket member 28 is subjected to high frequency alternating current effect fusion and thus welding or bonding the top end closure 16 to the upper end portion of the body member 12 to thereby form the plastic container 10.

Forming of the plastic container assembly 110 is similarly effected using electromagnetic bonding techniques, except that the external configuration of the lower portion of the cylindrically-shaped body member 114 and the internal configuration of the bottom end closure member 118 defines an annularly-shaped channel for receiving the ring-shaped gasket member 128 effecting an interference fit therebetween. In this respect given the compressibility of the ring-shaped gasket member, an interference fit is defined as a negative difference between cooperating parts of from 0.006 to 0.020 inches per side, i.e. the internal diameter of the ring-shaped gasket member 128 positioned on the shoulder member 144 of the bottom end closure member 118 is less than about 0.006 to 0.020 inches per side compared to the external diameter of the bottom end closure member 118. Additionally,, the body member 114 is inserted into the bottom end closure member 118 to the point at which the end surface portion of the body member 114 contacts the ring portion 148 formed in the bottom end closure member 118.

It will be readily appreciated by one skilled in the art, that the process of induction heating is accompanied without an external force, such as force "A" disclosed in copending application U.S. Ser. No. 07/128,030, filed Dec. 3, 1987 to maintain a cooperating relationship between the parts being molded until fusion and subsequent setting of the bonding material. In the process of the present invention, fusion of the thermoplastic electromagnetic material is accomplished under the forces of an interference fit between the parts of the assembly as well as the subsequent setting of the thermoplastic material thereby simplifying the coil assembly, as well as reducing and/or eliminating cooling requirements therefor, for concomitant cooling requirements generally necessary to increase productivity, i.e. by the more timely setting up of the bonding material.

While the present invention is described in the context of an intermediate step of filling the plastic container prior to enclosing the container, it will be understood that the process of the present invention may be effected by filling the container after compression fitting of one end and thence the other end closed by the simultaneous or successive induction heat of each weld portion to thereby locate the induction coil in one or successive processing status rather than intermediate to filling station.

Additionally, while the present invention is described in the context of cylindrically-shaped geometry of the cooperating plastic components, it will be understood by one skilled in the art that the process of the present invention may be accomplished with other geometries provided at the bonding point where the cooperating plastic components are positioned together under conditioning of an interference fitting relationship in the presence of an intermediate body of a flexible and resilient electromagnetic thermoplastic bonding material having a capability of melting and flowing in a path of least resistance thereby filling any irregular void areas at the interface between the member. Still further, as a result of a fixed length of gasket length is shear, a more reliable and stronger weld between members is achieved as compared with irregular manually deposited solvent.

While the invention has been described in connection with an exemplary embodiment thereof, it will be understood that many modifications will be apparent to those of ordinary skill in the art; and that this application is intended to cover any adaptations of variations thereof. Therefore, it is manifestly intended that this invention be only limited by the claims and the equivalents thereof.

What is claimed is:

1. An improved process for bonding plastic members utilizing a thermoplastic electromagnetic material at the point of bonding, which comprises:
   (a) positioning a strip of thermoplastic electromagnetic material proximate said bonding point;
   (b) positioning together said plastic members to effect an interference fitting relationship with said thermoplastic electromagnetic material; and
   (c) establishing an electromagnetic field about said bonding point for a time sufficient to melt said thermoplastic electromagnetic material.

2. An improved process for forming a particulate-containing plastic container assembly from a cylindrically-shaped body member and end closure members, which comprises:

positioning a thermoplastic electromagnetic gasket member at a bonding point between said cylindrically-shaped body member and one of said end closure members, said gasket member effecting an interference-fitting relationship with and between said body member and said one end closure member;

establishing an electromagnetic field about said bonding point for a time sufficient to melt said thermoplastic electromagnetic gasket member thereby to bond said one end closure member to said body member;

filling said body member with particulate material;

positioning a thermoplastic electromagnetic material between said cylindrically-shaped body member and another of said closure members, said gasket member effecting an interference-fitting relationship with and between said body member and said another end closure member; and establishing an electromagnetic field about said bonding point for a time sufficient to melt said thermoplastic electromagnetic gasket member thereby to bond said another end closure member to said body member and from said particulate-containing plastic container assembly.

3. The improved process for forming a particulate containing plastic container assembly from a cylindrically-shaped body member and end closure members as defined in claim 2 wherein said gasket members are positioned within an annular recess formed in said end closure members prior to relative positioning with respect to said cylindrically-shaped body member.

4. The improved process for forming a particulate containing plastic container assembly from a cylindrically-shaped body member and end closure members as defined in claim 2 wherein said gasket members are positioned on shoulder portions of said end closure members prior to relative positioning with respect to said cylindrically-shaped body member.

5. The improved process for forming a particulate containing plastic container assembly from a cylindrically-shaped body member and end closure members as defined in claim 2 wherein said particulate material is granulated carbon particles.

6. The improved process for forming a particulate containing plastic container assembly from a cylindrically-shaped body member and end closure members as defined in claim 3 or 4 wherein said positioning of said body members within said end closure members is under a force sufficient to effect said interference-fitting relationship.

* * * * *